UNITED STATES PATENT OFFICE 2,517,604

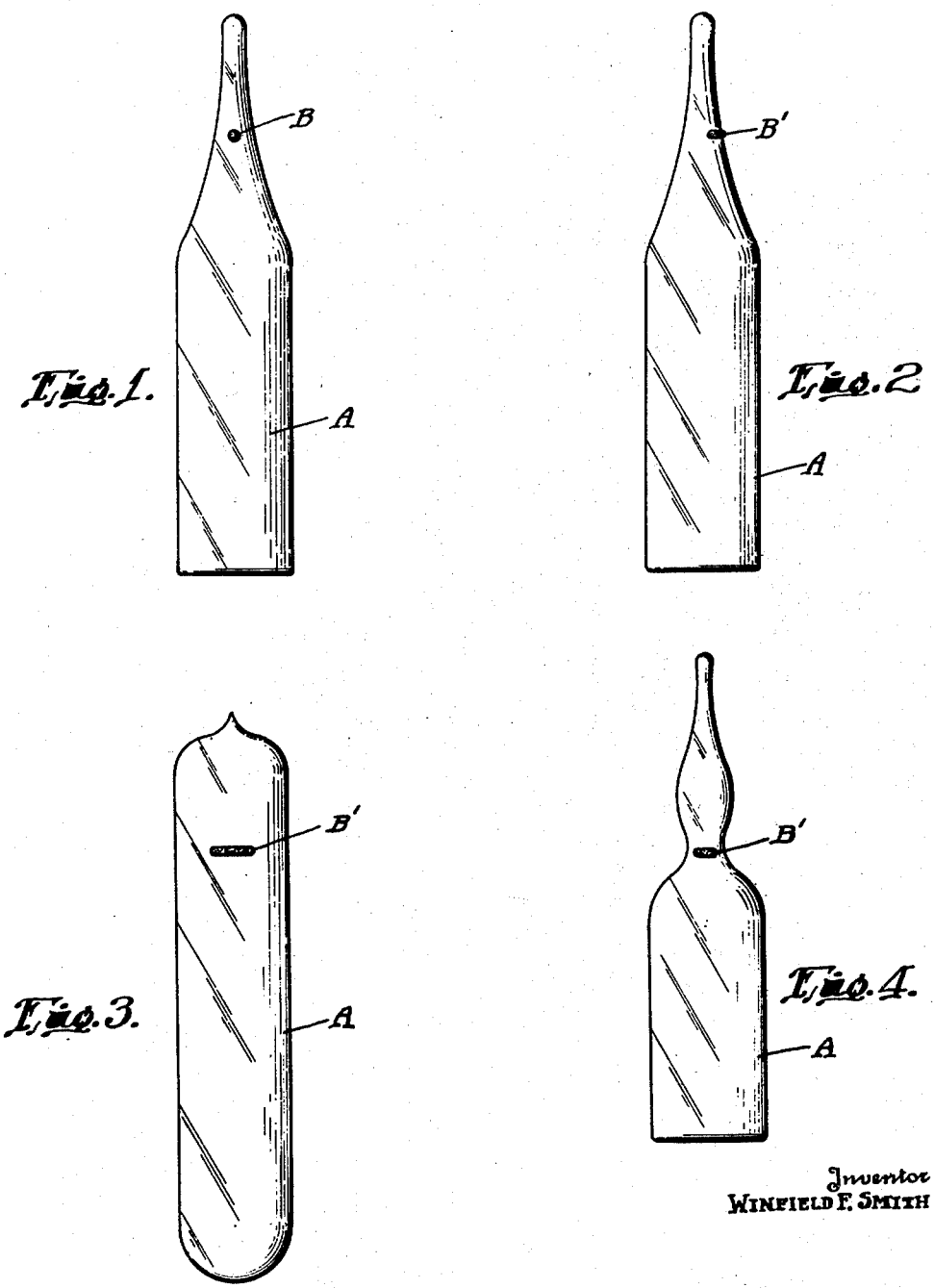

AMPOULE WITH BREAKABLE NECK

Winfield F. Smith, Vineland, N. J., assignor to Owens-Illinois Glass Company, a corporation of Ohio Application August 4, 1948, Serial No. 42,474

7 Claims. (Cl. 215—32)

The present invention is a continuation-in-part of application Serial No. 579,376, filed February 23, 1945, now abandoned, and relates to glass containers. The basic inventive thought of the parent case is being retained in this present case but whereas the invention was erroneously described in the parent case as emanating from the differences in the coefficients of expansion between the glass and the fusible material it has since been factually determined that the essence of the invention actually stems from the differences in the rate and degree of contraction in the glass and the fusible material. This invention pertains to a container having a fusible coating applied locally thereto and to a method of applying the coating in a manner such that a defined area of the surface of the container is of greater frangibility than the remainder of the vessel. The coating selected, with reference to the container, is one in which the overall contraction undergone by the coating material, on cooling from the softening temperature down to room temperature, is greater than the total contraction of the glass container on which the coating material is applied. The differential contraction is such as to create a state of tension in the coating.

Some types of glass containers, such as ampuls, or vials are sealed by flame sealing the end through which it is filled after the contents have been placed in the container. By thus sealing the vessels the contents are protected against contamination and evaporation. When it is desired to remove the contents, the customary method of breaking off the neck of an ampul, for instance, is to scratch the surface of the ampul neck by drawing a file transversely across the neck at a point or line thereon thereby to increase the frangibility of the glass at the file mark, after which, by grasping the neck between the thumbs and fingers, a bending pressure is exerted on each side of the weakened line sufficient to break the glass. This method of opening has the disadvantage that it requires equipment other than the ampul itself (i. e. the file). In some cases considerable difficulty is encountered in effecting an opening and shattering of the stem sometimes results.

It has also been proposed to weaken the container by creating a strain in the glass, per se, at some predetermined point therein, usually by means of a cold tool engaging the glass while the latter is at a relatively high temperature. The danger of preweakened containers is that, unless the degree of weakening or scoring is controllable within certain limits, accidental breakage, either from heat shock or jarring, is likely to occur.

It is one of the objects of the present invention to increase the frangibility of a local area in a glass container by applying a selected material over a relatively small area thereof or along a line thereof, which material will be fused to the container wall to form a positive bond with the glass and which has a rate of contraction differing from that of the glass or a total thermal expansion greater than that of the glass.

It has been found by experiment that the frangibility of the glass is controllable through the type of coating used, that is, the resistance to breakage at the frangible section may be increased or decreased by regulating the differences of the expansivity or contraction of the applied materials in relation to the expansivity or contraction of the glass container. It is, therefore, important in the carrying out of the invention so to select and control the constituents of the coating material that a predetermined difference between the contraction of the glass and coating respectively will be obtained.

It is a further object of the invention to apply a coating which will produce a visible indication on the glass either by color or contour of the point or area at which transverse pressure is to be applied to effect fracture of the glass.

Other objects will be apparent from the following description of the invention taken in connection with the accompanying drawings, in which:

Fig. 1 is an elevation of a sealed ampul having a coating of contrasting fused material applied thereto over a relatively small area;

Fig. 2 is an elevation of another type of ampul to which the coating material has been applied along a line;

Fig. 3 is an elevation of a sealed vial designed to hold ligatures or the like, the coating being applied thereto along a line at which the vial is to be fractured; and Fig. 4 illustrates the application of the invention to a sealed ampul of the constricted neck type.

In one form of the invention, a frit having a predetermined composition, the rate of contraction of which has been determined in advance, is employed. The frit may be one of a group including borosilicates of lead, sodium, potassium, lithium, or the like. This frit is finely ground and mixed with a suitable carrier vehicle, such as a combination of oils. To identify the location of the frangible area, the coating material preferably includes coloring matter such as salts of cobalt, chromium, titanium, antimony, and the like, but this coating may if desired be of the same color as the container and be distinguished as the breaking point by the difference in contour. After applying the coating to the container, the glass and coating material are heated to a temperature sufficiently high to melt the frit but less than the melting point of the glass. In fusing the coating to the glass there is some interpenetration between the coating and the glass. Upon cooling, the coating solidifies to form a strong bond between the coating and the container. Usually the softening point of the coating is in a range lying approximately between 450° and 600° C.

The term softening point, as used herein, refers to the maximum on the curve of expansion versus temperature, when determined by means of the interferometer dilatometer. The actual fusion temperatures, used to bond the coating material to glass, are higher, ranging from 500° C. to 600° C.

Since the coating and glass are so selected that their expansivity or rate of contraction differ from each other, one of the materials will shrink to a greater degree than the other. The result is that, after cooling, the material having the greater contractive rate (namely the coating) is placed under tension. The difference in expansivities or contraction of the coating and glass may be so controlled that by application of slight further pressure the tensile strength of the material will be exceeded and fracture will result. It is found that accidental breakage from jarring and heat shock, such as occurs from prescoring and strains produced by cold tools, is greatly minimized if not entirely obviated.

As examples of the manner in which selected coatings, may be applied to glass articles, tubing made from glasses, analyses of which are given below, were coated locally over a relatively small area with coatings, the compositions of which are also tabulated herein. The glasses referred to have the following analyses:

A third coating of lead chloride, designated as (c), was applied to certain of the glasses in the foregoing analysis table, this coating material consisting of 74.5% lead and 25.5% chlorine. The lead chloride softens at a temperature of 501° C. and has a coefficient of expansion which is difficult to determine but is known to be relatively large. Experiments performed by us have indicated that this material has a linear coefficient of thermal expansion of approximately $298 \times 10^{-7}$ per ° C. over the temperature range from room temperature to 300° C.

In the case of the glass designated as (A) and coated with the composition (a), the coefficient of expansion of the glass per degree centigrade within ordinary temperatures in 0.000005, while that of the coating is 0.0000086. The softening temperature of the glass is 653° C. and that of the coating is 463° C. The coated glass is heated to the annealing temperature of the glass (575° C.), at which temperature the coating will melt, but there will be no deformation of the glass from which the container is made. The coated glass is allowed to cool and when the temperature has decreased to approximately 460° C. the coating material is still soft, but with further cooling it becomes rigid at approximately 430° C. Upon reaching this temperature the coating becomes rigidly bonded to the glass and must therefore accept its dimensions. On cooling below this temperature stress begins to develop because of the difference between the rate of contraction of the coating and that of the glass. In this temperature range, the glass composing the container exhibits a rate of contraction which is constant with respect to temperature; whereas the coating material exhibits a rate of contraction which is varial with respect to temperature. The rate of contraction of the coating material in this temperature range is greater than the rate of contraction of the container. As cooling con-

|  | (A) | (B) | (C) | (D) | (E) |
|---|---|---|---|---|---|
| $SiO_2$ per cent | 74.7 | 65.2 | 67.6 | | 68.3 |
| $B_2O_3$ do | 9.6 | 5.0 | 1.5 | | 2.2 |
| $Al_2O_3$ do | 5.6 | 2.4 | 2.8 | | 2.0 |
| ZnO do | 0.1 | 5.4 | | 18.0 | 6.8 |
| MgO do | | 1.6 | 4.0 | 10.0 | .1 |
| CaO do | 0.9 | 2.6 | 5.6 | | 5.7 |
| $Na_2O$ do | 6.4 | 9.1 | 15.1 | | 14.5 |
| $K_2O$ do | 0.5 | 0.8 | 1.3 | | .4 |
| $Sb_2O_3$ do | 0.009 | 0.6 | | | |
| $Fe_2O_3$ do | | 3.3 | | | |
| MnO do | | 4.0 | | | |
| BaO do | 2.2 | | 1.9 | | |
| $P_2O_5$ do | | | | 72.0 | |
| $As_2O_3$ do | 0.027 | | | | |
| Coefficient of Expansion | $50 \times 10^{-7}$ | $69 \times 10^{-7}$ | $92 \times 10^{-7}$ | $59 \times 10^{-7}$ | $88 \times 10^{-7}$ |
| Softening Temperature °C | 653 | 612 | 590 | 675 | 600 |
| Annealing Temperature °C | 575 | 548 | 520 | 605 | 536 |

Two of the coatings employed have the following analyses:

|  | (a) | (b) |
|---|---|---|
| $SiO_2$ per cent | 27.9 | 27.2 |
| $B_2O_3$ do | 4.2 | 2.9 |
| $Al_2O_3$ do | 1.3 | 0.84 |
| $TiO_2$ do | 12.5 | |
| ZnO do | | 2.3 |
| PbO do | 48.8 | 51.0 |
| CaO+MgO do | 0.16 | 0.17 |
| $Na_2O$ do | 2.9 | 1.08 |
| $K_2O$ do | 0.19 | 0.22 |
| $Li_2O$ do | 0.73 | |
| S do | | 0.86 |
| $Cr_2O_3$ do | | 5.6 |
| CoO do | | 1.2 |
| CdO do | | 7.2 |
| $As_2O_3$ do | 0.58 | .1 |
| $Sb_2O_3$ do | | |
| Coefficient of Expansion | $86 \times 10^{-7}$ | $73 \times 10^{-7}$ |
| Softening Temperature °C | 463 | 484 | tinues, a temperature is reached at which the coating material assumes a constant rate of contraction with respect to temperature, but when this point has been reached, the coating material has undergone a greater contraction than the container. This discrepancy in contraction results in the establishment of stresses between the coating and the glass, the direction of the stress being such as to produce a state of tension in the coating material. This tension assists in the initiation of a break when additional tension is applied by flexing action of the fingers or by other means.

The glass directly underneath the applied coating material is in a state of compression. However, analysis of the stress pattern shows that the zone of glass immediately outside of the coating material is in a state of tension. These localized tensile stresses in the glass may serve as the starting point for a break when added stress is applied. This explains why a break is sometimes observed to follow along the edge of the applied coating material.

When external stress is applied to the combination of glass and the applied coating material in such a way as to impose an added tensile stress in the surface, a break will occur at the point where the combined tensile stresses first exceed the tensile strength of the material. If this point is in the coating itself, a crack will begin in the surface of the coating material and will be propagated through the coating into the glass. More often the point of greatest weakness occurs in the glass in the zone immediately bordering the area of the applied coating. For this reason a break usually occurs at the borderline of the applied coating.

Type (a) coating becomes rigid at approximately 430° C. On cooling from this temperature down to room temperature the material in question has been found to undergo a contraction of 45 microns per centimeter. Type (A) glass has been found to contract 20 microns per centimeter on cooling from 430° C. to room temperature. Therefore, if type (a) coating material is fused to the surface of (A) glass and the combination is allowed to cool to room temperature, it can be seen that the coating will contract 125% more than the glass. It has been found that this coating (a) produces a definite weakening when fused to the surface of (A) glass. The force required to break the glass by flexure is 58% less when coating (a) is fused to the surface than is the case with a similar sample of glass without the coating.

Glass (D) has a coefficient of thermal expansion of 0.0000059 per degrees centigrade and on cooling from 430° C. to room temperature contracts approximately 24 microns per centimeter. Therefore if type (a) coating is fused to the surface of type (D) glass and the combination is allowed to cool to room temperature, the coating will contract 88% more than the glass. It has been found that glass (D) coated with material (a) requires a 44% smaller load to break the glass by flexure, than with uncoated glass.

Type (b) coating becomes rigid at approximately 450° C. and on cooling from this temperature down to room temperature undergoes a contraction of approximately 38 microns per centimeter. Type (B) glass has been found to contract approximately 30 microns per centimeter on cooling from 450° C. to room temperature. Therefore when type (b) coating is fused to the surface of type (B) glass and the combination is allowed to cool to room temperature, the coating will contract 27% more than the glass. By test it has been found that type (B) glass coated with type (b) coating requires 15% less load to break than in the case of uncoated glass. Type (E) glass has a coefficient of expansion of 0.0000088 per degree of centigrade and undergoes a contraction of approximately 36 microns per centimeter on cooling from 430° C. to room temperature. Therefore when coating material (a) is fused to the surface of glass (E) and the combination is allowed to cool to room temperature the coating material will contract 25% more than the glass. Tests have shown that type (E) glass coated with type (a) coating material requires 11% less load to break in flexure than is the case with uncoated type (E) glass.

Through a series of tests it has been found that a minimum degree of weakening must be imparted by the applied coating to permit safe and easy breaking under applied force and also to prevent irregular breaking or shattering of the ampul.

This minimum degree of weakening appears to be in that range wherein at least a 11% lesser applied force is required to break off the coated ampul neck than that required to break an uncoated ampul.

By combining a properly selected coating with a given glass any desired degree of weakening may be obtained ranging upwards from this 11% minimum.

The more desirable range for practical purposes and safety in breaking with the fingers will of course be in ranges upwards from 11% depending upon the combination of glass and coating as well as the type or shape of ampul.

Thus it should be clear that the important factors in providing utility and facility in this invention are not the coefficients of expansion as ordinarily determined, but the total contractions of the fused coating and the glass itself when cooled from the firing or fusing temperature to room temperature.

The above is based upon the fact that a fusible coating having a total thermal expansion higher than that of the glass will produce compression strain in the glass and tension in the coating.

It has been determined by actual tests that the force necessary to fracture glass tubing thus coated is considerably less than that required to break similar tubing having the same dimensions and characteristics but which was not coated. In the case of glass (A) and coating (a), of which the analyses have been given herein, a series of tests indicated that the reduction of load required to break the coated tubing is about 58% less than that necessary to fracture uncoated tubing.

Samples of the other glasses referred to were coated with certain of the compositions disclosed herein and the results of tests show that where a substantial difference between the expansivity or rate of contraction of glass tubing and the coating material exists, the frangibility of the coated area is increased. Comparative results, expressed in similar load reduction, were as follows:

| | Per cent |
|---|---|
| Glass (A) coated with material (a) | 58 |
| Glass (D) coated with material (a) | 44 |
| Glass (C) coated with material (c) | 33 |
| Glass (B) coated with material (b) | 15 |
| Glass (E) coated with material (a) | 11 |

It is to be noted that the coating materials all soften or melt at temperatures less than the deformation temperatures of the glasses. Hence a bond will be formed without distortion of the glass body to which the coating is applied. It is also to be noted that glasses (A), (B), (C) and (E) are siliceous, while glass (D) is non-siliceous. Again, coating materials (a) and (b) are siliceous as distinguished from material (c) which is non-siliceous. It will, therefore, be seen that very satisfactory results have been obtained with combinations of siliceous glass and either siliceous or non-siliceous coating material, as well as with non-siliceous glass and either siliceous or non-siliceous coating material. In each combination, however, the rate of contraction of the coating is substantially greater than that of the glass body to which it is applied. It is significant, on the other hand, that, if the rate of contraction of the coating and the glass are the same or nearly equal, the strength of the area of the combined glass and coating is not decreased and may actually be increased. It is evident, therefore, that selection of a coating having a rate of contraction greater than that of the glass to which it is applied is important.

The coating material may be applied to the container A as shown in any of the figures, i. e., over a small area, as shown at B in Fig. 1, or along a line, as shown at B' in Figs. 2, 3, and 4. In some cases it may be desirable to extend the indicia mark or line throughout the major or possibly the entire portion of the circumference of the ampul at the line or point of breakage especially where an unequal wall thickness or contour would present more than normal resistance to fracture when bending pressure is applied. While specific glass frits or enamels have been referred to in the foregoing examples, the coating materials may be selected from a varied list of fusible coating materials, the expansivities and characteristics of which have been determined in advance.

The container may be parted at the section where the coating is applied by any of the well-known methods for opening these types of hermetically sealed containers. While the customary method for opening these containers is to apply finger pressure on each side of the frangible section, parting may also result by shock as for example, by application of a predetermined degree of heat or cold to the frangible section.

From the foregoing it will be evident that, by reason of the differences in contraction of the coating material and the glass from which the container is made, a localized area is placed under an initial strain when the applied coating has solidified and cooled. This provides increased frangibility of the localized area and by proper selection of materials these differences of expansivities and/or contractions are readily controllable within desirable limits to prevent accidental fracture of the container. The area is furthermore visible due to the contrast between the coating and the glass both as to color and contour so that the proper line of fracture is readily determined.

The terms "expansivity" and "contraction" have been used interchangeably herein since a vitreous material having a higher coefficient of expansion than a second material will always undergo a greater total contraction on cooling.

The terms "color" and "coating" have been used interchangeably herein but both refer to the fusible material.

The various examples of glasses and coatings given in this specification are to be construed only as illustrative of the invention and not as limitations thereof.

I claim:

1. A glass container having a relatively small localized area coated with a solidified fusible material, said coating material being fused to the glass of the container to form a strong bond therewith, the coefficient of expansion of the coating material being greater than 120% of that of said glass, said coating material being under tension and said localized area of the glass being under compression whereby an initial force is set up in the glass at the juncture of the coated and uncoated portions of said glass, said force being less than the force necessary to effect complete fracture of the glass.

2. A tubular sealed container consisting of frangible material and comprising means to facilitate breaking the container at a circumferential line of cleavage intermediate its ends, said means including a localized surface coating of frangible vitreous material in the form of a narrow strip or line extending circumferentially of the container at the line of cleavage, said coating material being welded to the container and under tension, the portion of the container material which is directly beneath and in contact with said coating material being under a stress of compression, said coating material having a greater degree of contraction than the container material while the said materials are cooling through a temperature range below that temperature at which said coating material becomes substantially solid.

3. The article defined in claim 2 wherein said container comprises a body portion, a neck portion of reduced diameter, and an intermediate shoulder portion, said coating material being located where the neck and shoulder portions meet.

4. A glass article comprising a tubular body having means to facilitate the dividing of said body by severance along a predetermined line of cleavage extending circumferentially of said body at a plane intermediate the ends thereof, said means comprising a coating of a material applied to the exterior surface of said body in the form of a narrow strip or line located at the plane of severance and extending circumferentially of said body through a predetermined arc, said material being fused to the glass and under a stress of tension by which the frangibility of the glass at said line is weakened, said material being sufficiently hard and having sufficient tensile strength to maintain said tension while at room temperatures, said tension being insufficient to cause spontaneous rupture at room temperatures, said material having a fusing temperature substantially below the annealing temperature of the glass and having a degree of contraction greater than that of the glass while the glass and said material are cooling through a temperature range extending from the fusing temperature of said material to room temperature.

5. The article defined in claim 4 wherein the said coating material consists of vitreous material and a coloring matter which gives to the coating a color different from that of the glass.

6. A tubular glass body and a coating of hard material fused to the exterior surface of said body, said material being in the form of a narrow strip or line extending circumferentially of said body in a plane between and spaced from the ends of said body, said coating material being under a tensile stress, and the glass directly beneath and in direct contact with the coating material being under stress induced by said tensile stress of the coating material and by which the frangibility of the glass is increased along said line and by which breakage of the glass body at said plane by the manual application of force thereto is facilitated, said material having a fusing temperature substantially below the annealing temperature of the glass and having a degree of contraction greater than that of the glass while the glass and said material are cooling through a temperature range extending from the fusing temperature of said material to room temperature.

7. A tubular sealed container consisting of frangible material and comprising means to facilitate breaking the container at a circumferential line of cleavage intermediate its ends, said means including a localized surface coating of frangible vitreous material at the line of cleavage, said coating material being welded to the container and under tension, the portion of the container material which is directly beneath and in contact with said coating material being under a stress of compression, said coating material having a greater degree of contraction than the container material while the said materials are cooling through a temperature range below that temperature at which said coating material becomes substantially solid.

WINFIELD F. SMITH.

REFERENCES CITED

The following references are of record in the file of this patent:

UNITED STATES PATENTS

| Number | Name | Date |
|---|---|---|
| 2,053,923 | Stewart | Sept. 8, 1936 |
| 2,160,560 | Parkinson | May 30, 1939 |
| 2,167,589 | Schutz | July 25, 1939 |

FOREIGN PATENTS

| Number | Country | Date |
|---|---|---|
| 637,295 | France | Jan. 28, 1938 |